United States Patent [19]
Voldby

[11] Patent Number: 5,584,376
[45] Date of Patent: Dec. 17, 1996

[54] PARCELS CONVEYOR

[75] Inventor: Per Voldby, Slangerup, Denmark

[73] Assignee: PV System ApS, Slangerup, Denmark

[21] Appl. No.: 522,398

[22] PCT Filed: Mar. 9, 1994

[86] PCT No.: PCT/DK94/00102

§ 371 Date: Sep. 18, 1995

§ 102(e) Date: Sep. 18, 1995

[87] PCT Pub. No.: WO94/21542

PCT Pub. Date: Sep. 29, 1994

[30] Foreign Application Priority Data

Mar. 16, 1993 [DK] Denmark ................. 0297/93

[51] Int. Cl.[6] ..................................................... B65G 21/14
[52] U.S. Cl. .................... 198/812; 193/35 TE; 193/35 F
[58] Field of Search ..................... 198/588, 812; 193/35 TE, 35 F; 244/118.1

[56] References Cited

U.S. PATENT DOCUMENTS 1,906,288  5/1933  Twomley.
2,494,302  1/1950  Mason.
3,170,553  2/1965  McElroy.
4,164,338  8/1979  Myron ............................... 193/35 FX
5,040,655  8/1991  Lacagnina ....................... 193/35 TEX
5,096,050  3/1992  Hodlewsky.

Primary Examiner—James R. Bidwell
Attorney, Agent, or Firm—Fulbright & Jaworski L.L.P.

[57] ABSTRACT

A parcel conveyor having a number of rollers forming a supporting surface for the cargo to be transported is disclosed. The conveyor is divided into a number of separate roller/shaft units having the same shape which are linked together by a single, longitudinally rigid but sidewards flexible, driving device, such as a cardan chain. The units run on rollers on the floor and can be pushed or pulled centrally in a straight line or in a curve by way of the driving means. By use of such a conveyor, luggage can easily be transported on the cargo supporting rollers all the way to the end of the conveyor even as the conveyor is progressively pulled out of a cargo compartment as the cargo compartment is filled with luggage.

10 Claims, 5 Drawing Sheets

PARCELS CONVEYOR

BACKGROUND OF THE INVENTION

1. Field of the Invention

The invention relates to a parcels conveyor for transporting general cargo, such as parcels, boxes, luggage, and of the kind having a number of rollers forming a supporting surface for the cargo to be transported.

The manual handling of general cargo, such as parcels, boxes, luggage, at the delivery end of a parcels conveyor is known to be a difficult, demanding job which has been shown to lead to frequent occupational injuries among personnel.

The problem is particularly acute in operations such as the loading of luggage into the cargo compartment of an aircraft. Normally, a parcels conveyor is placed outside the door of the cargo compartment, on which the luggage is transported from or to the door. An assistant inside the aircraft must then take each suitcase off the conveyor and ensure that it is placed correctly in the compartment, without any kind of mechanical assistance in the compartment itself. As the cargo compartment has a rather limited floor-to-ceiling height, the assistant wil often have to work in an awkward position or even a crouching position. Obviously, this work overloads the assistant's back and demands furthermore strong arms. For this reason, the luggage cannot always be treated with the necessary care and this difficult job very often takes a relatively long time to perform.

As the health authorities are now increasingly examining the causes of workplace injuries which could possibly be declared occupational injuries, a solution to the problem must therefore be found.

2. Discussion of the Related Technology

A parcels conveyor is known from U.S. Pat. No. 2,494,302. The conveyor known from the said U.S. Patent belongs indeed to the normal category of conveyors with cargo supporting rollers on the top side, and, especially on vertically adjustable legs, transport rollers on the underside. This well-known conveyor was primarily developed to create a type of in-between conveyor linked to one or two normal rectilinear and/or curved conveyors and in this situation to create a "shape-fixed" junction between these conveyors, for which reason each unit in this conveyor is indeed linked by means of pivots, but also has steady connecting links from one under to the other, in order to achieve a shape-fixed junction.

SUMMARY OF THE INVENTION

The invention provides guidelines for such a solution and in that respect a conveyor of the kind mentioned in the introduction according to the invention is characterized in that each unit essentially consists of a supporting rail extending along the width of the conveyor, that the supporting rail of each unit carries a shaft parallel to the rail for said cargo supporting rollers, that said conveyor supporting rollers are journalled on shafts located underneath each supporting rail in close proximity of said rail and parallel with said rail, that the roller/shaft units of the conveyor essentially at the centre line of the conveyor are linked together by means of a longitudinally rigid, flexible means, fastened to the underside of the supporting rail of each unit, and keeping these units linked together at even intervals, and which together with the rail supporting rollers rest upon the base and supports the roller/shaft units of the conveyor.

The invention was made in consideration of the fact that there is a strong need for a conveyor which could easily, and without any particularly large manual assistance or manual effort, "curve", i.e. be shaped so as to bring luggage from the door of the cargo compartment all the way to the end of the cargo compartment, that the existing so-called flexitracks, consisting of an upper layer of cargo supporting rollers on shafts, linked at the ends with a deformable scissor mechanism of mutually articulated rods, were not very appropriate, even though they could be constructed with lower supporting rollers, able to run on the floor, particularly because these flexitracks lack vertical stability, especially in a curve and that in addition there was a need for a conveyor of very limited height dimensions above floor level.

The invention is based on the recognition that it is appropriate to divide the conveyor into a number of separate roller/shaft units, all of the same shape, and to keep these units together, approximately centrally, by means of one single longitudinally rigid, but sidewards flexible driving means. As it will be explained later, such as a driving means can be a cardan chain.

As the units run on rollers on the floor and their structure does not require much height and as they can be pushed or pulled almost centrally in a straight line or in a curve by means of the chain, it is easy to locate the conveyor in the cargo compartment.

Experience shows that if the assistant in the cargo compartment simply guides the end of the conveyor, while the chain at the other end is pushed manually or mechanically, the conveyor will take the correct form. Experience also shows that when a traction is applied to the chain in order to change the position of the conveyor in the cargo compartment or to pull it out of the compartment, the centre line of the chain follows exactly the curve it was placed in originally. During such a curve movement, the rear units of the conveyor show no tendency to approach the centre of the curve and they all follow the desired original curve.

By means of such a conveyor luggage can easily be transported on the cargo supporting rollers all the way to the end of the conveyor which is progressively pulled out as the cargo compartment is being filled.

Appropriate forms of embodiment of the conveyor according to the invention appear from the dependent claims.

DESCRIPTION OF THE DRAWINGS

The invention is explained in detail below with reference to the schematical drawing in which

FIG. 1 shows part of the conveyor according to the invention. The conveyor consists of a number of roller/shaft units 2, 3, 4, . . . , linked together by means of driving chain 5.

Figure 3:
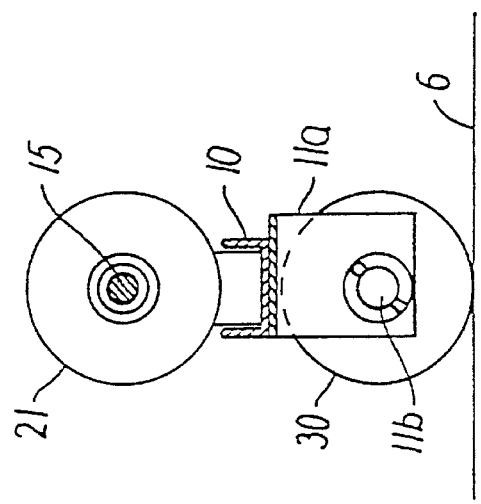

Unit 2 includes a rail 10, of e.g. metal, preferably a U-shaped rail as shown in FIG. 3. On this rail 10, a number of vertical plate elements 11, 12, 13, 14, are mounted, in which a shaft 15 is journalled, extending parallel to the rail 10.

On this shaftaxle 15 a number of rollers 20, 21, 22, etc., are journalled. These rollers 20, 21, 22, etc. are freely pivotable on their shaft 15, as they are maintained in axial position by means of circlips, spacer pipe sections between the rollers etc. This solution has the advantage that a damaged or worn roller easily can be replaced.

However, in principle the rollers may also be fixed on their shaft and turn together with this shaft. Yet, this solution is relatively less appropriate, as the rollers in that case will have to run at the same speed. When the conveyor, as explained below, is to follow a curve, there will be more friction between the cargo and the outer rollers than on the inner rollers. Of course the shaft with the corresponding rollers can be divided into a number of separate, coaxial sections, as known per se.

Figure 2:
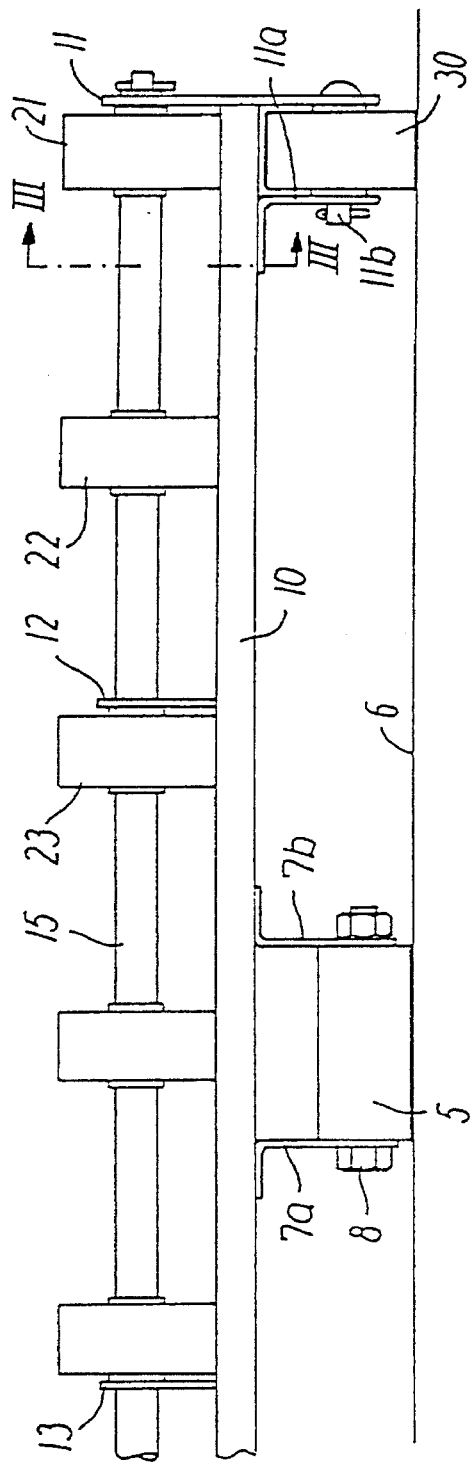
FIG. 2 and 3 show in detail a form of embodiment of such a roller/shaft unit, e.g. the unit 2 in FIG. 1.

As it appears from FIG. 2, there is clearance between each roller 20, 21, 22, . . . and the rail 10.

Figure 1:
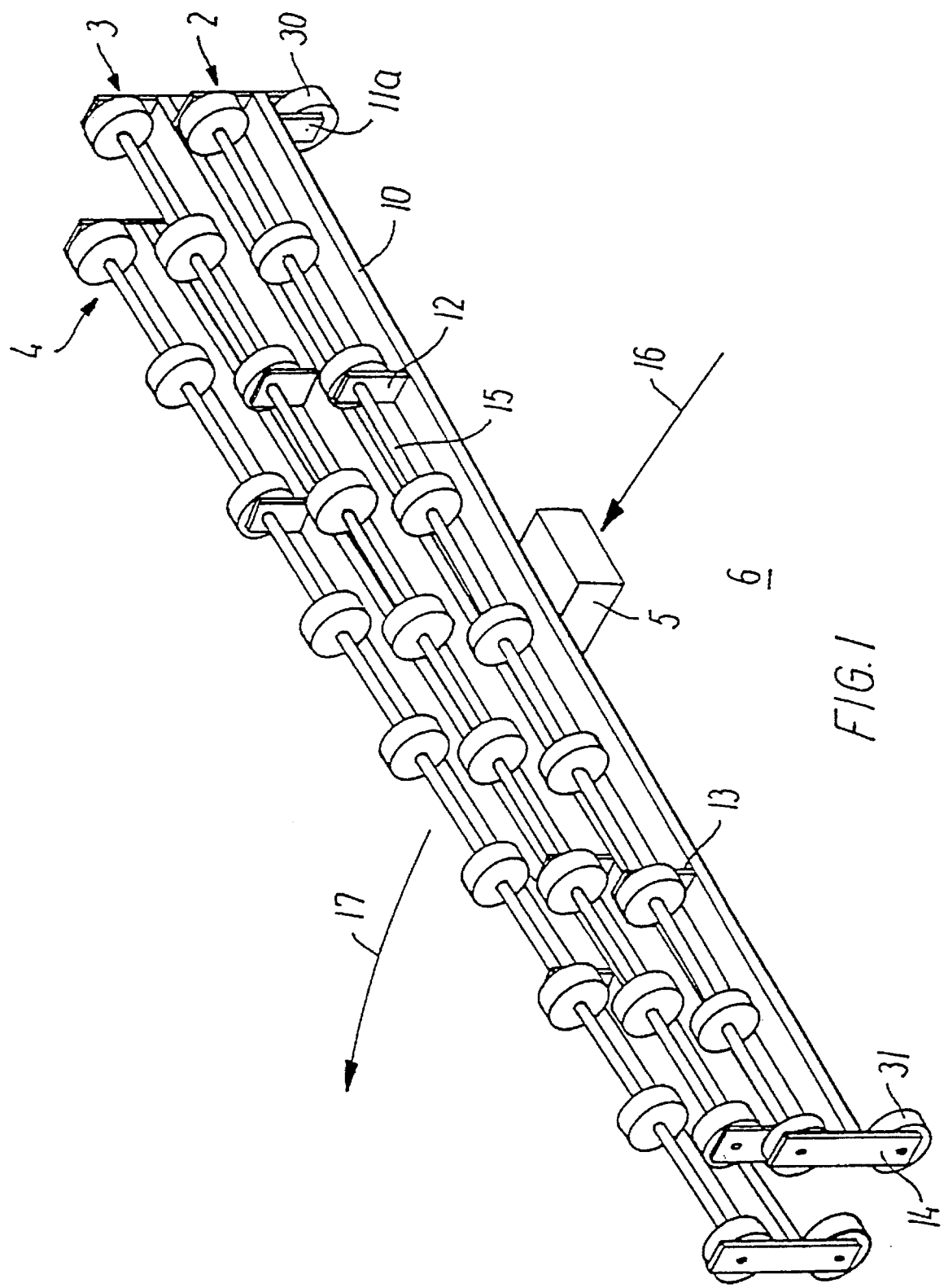
FIG. 1 shows three roller/shaft units of the conveyor in perspective, FIG. 2 a part of a roller/shaft unit with chain link, seen in the longitudinal direction of the conveyor, FIG. 3 a section along the line III—III in FIG. 2, FIG. 4 an example of part of the conveyor being placed in the cargo compartment, FIG. 5 seen sideways, an example of a combination of a luggage belt line and a conveyor according to the invention for loading the cargo compartment of an aircraft, FIG. 6 corresponds to FIG. 1, but showing another embodiment, and FIG. 7 corresponds to FIG. 2, but showing the embodiment shown in FIG. 6.

On the underside of the rail 10 and at each end thereof, there are two similar supporting rollers 30, 31, which are also freely pivotable in relation to the rail 10, and which are held between the outer plate elements 11, 14 and two corresponding angle pieces, e.g. 11a (the angle piece corresponding to outer plate element 14 is hidden from view in FIG. 1 by supporting roller 31), and fixed under the rail 10, by means of a short shaft, e.g., 11b (the short shaft fixing supporting roller 31 between outer plate element 14 and its corresponding angle piece is hidden from view).

All roller/shaft units of the conveyor are basically designed the same way as described above.

All roller/shaft units are linked with a driving chain of which FIG. 1 and 2 show only one single chain link 5.

Figure 4:
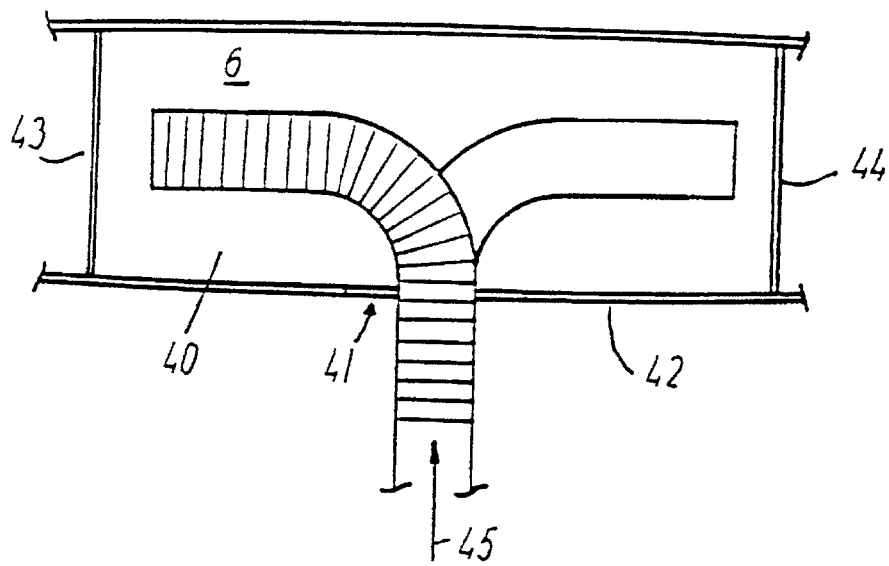

FIG. 1 illustrates the situation in which the conveyor is about to go from the straight stretch, as shown at the arrow 16, to a curve stretch, as shown at the arrow 17, see also FIG. 4.

There is one roller/shaft unit for each link in the chain.

In order to make the conveyor follow a curve and moreover as the conveyor—as will be explained in detail later— may also be placed on a base which is not necessarily plane, a so-called "curving" chain or a cardan chain must be used, i.e. a chain with two degrees of freedom, one along the curve and the other up/down in relation to a horizontal plane.

It could for instance be a chain of the type "Uni-slat top" or "Uni-Flex", both from the firm Uni-Chains Int. A/S, Vejle, Denmark. A chain of the latter type essentially consists of Y-shaped chained links, linked together so that the chain can be curved like a bike chain, but can also be bent sidewards in a curve.

Such a chain link can be made of metal, but it is appropriate to use links made of plastic material, e.g. acetate. The means to fasten each roller/shaft unit to the corresponding chain link can be configured in many different ways, depending on the type of chain used. FIG. 2 shows an example in which the chain link 5 is only shown as a rectangular block and where this link is maintained between two angle pieces 7a, 7b, fastened to the underside of the rail 10 by means of a clamping bolt 8.

The idea is that when the conveyor is placed on a plane base 6, e.g. a floor, the chain link 5 and the two outer, lower rollers 30, 31 rest on the supporting base 6. This also means that the location of the axis of these supporting rollers 30, 31 in relation to the rail 10 depends on the type of chain chosen, i.e. the height of the chain link.

When the chain links and the two outer supporting rollers 30, 31 are placed on a plane base, the top generatrix on the top rollers 20, 21, 22, etc. . . will be at a level parallel to the base and this level is the supporting level of the cargo to be transported on this conveyor.

As it appears from FIG. 1 each chain link will rotate a little in relation to each other when the chain has to follow the desired curve as shown by the arrow 17. Each roller/shaft unit will therefore also rotate in relation to each other. This means that the inner ends (nearest to the centre of the curve) of the roller/shaft units will approach each other, while the opposite ends will move a little away from each other. In other words, the units find a mutual position similar to a fan.

In order to get a fan angle as large as possible considering the diameter of the rollers 20, 21, 22, etc., it is appropriate, as shown in FIG. 1, to mount all units on the chain alternately offset in their longitudinal direction.

While FIG. 1 shows the roller/shaft units 2, 3, 4, . . . with nine upper rollers on each rail, it is to be understood that the number of rollers can be chosen according to different considerations, such as the desired conveyor width, the weight of the cargo to be transported etc. The preceding description builds on the fact that U-rails have been used for the rails 10, but obviously other types of rails can be used if the rail chosen is sufficiently torsion stiff.

The embodiment described here has two outer, lower supporting rollers 30, 31. The approximately central chain and two such outer supporting rollers will normally be sufficient, but for heavy cargo it may be appropriate to have extra lower supporting rollers on each side of the chain and between said chain and the outer supporting rollers 30, 31.

The mode of operation of the conveyor will now be explained below with reference to FIG. 4 and 5.

FIG. 4 shows, seen from above and extremely schematically, the end of the conveyor introduced into the cargo compartment 40, through the door 41 in an aircraft 42. FIG. 4 shows an example of the conveyor end placed, in the drawing, in the left part of the cargo compartment 40, with the conveyor end almost all the way up to the end wall 43 of the cargo compartment 40. For the sake of clarity, the roller/shaft units in FIG. 4 are only suggested by means of crosslines over part of the conveyor.

This part of the conveyor is placed in the cargo compartment by pushing the chain from the outside and in the direction shown by the arrow 45, while an assistant in the cargo compartment 40 guides the end of the conveyor, which, with the lower rollers 30, 31, runs on the floor 6 of the cargo compartment 40. When the conveyor is placed in the position as shown in FIG. 4, the loading of parcels, boxes and luggage can start.

As the left part of the cargo compartment 40 is being filled with cargo, the conveyor can be withdrawn progressively by pulling the chain from the outside in the opposite direction of the arrow 45.

When the left part of the cargo compartment has been filled with cargo in an adequate way, the conveyor end is diverted to the opposite end wall 44 of the cargo compartment 40, after which the right side of the cargo compartment 40 will be filled similarly. As the right part of the compartment is being filled, the conveyor is withdrawn in the same way.

As already mentioned the chain is sufficiently stiff longitudinally for the conveyor to be pushed in the direction of the arrow 45 and withdrawn in the opposite direction. The directional stability is partly due to the longitudinal rigidity of the chain, partly to the net weight of the conveyor on the floor 6 via the rollers 30, 31 and the chain links.

Figure 5:
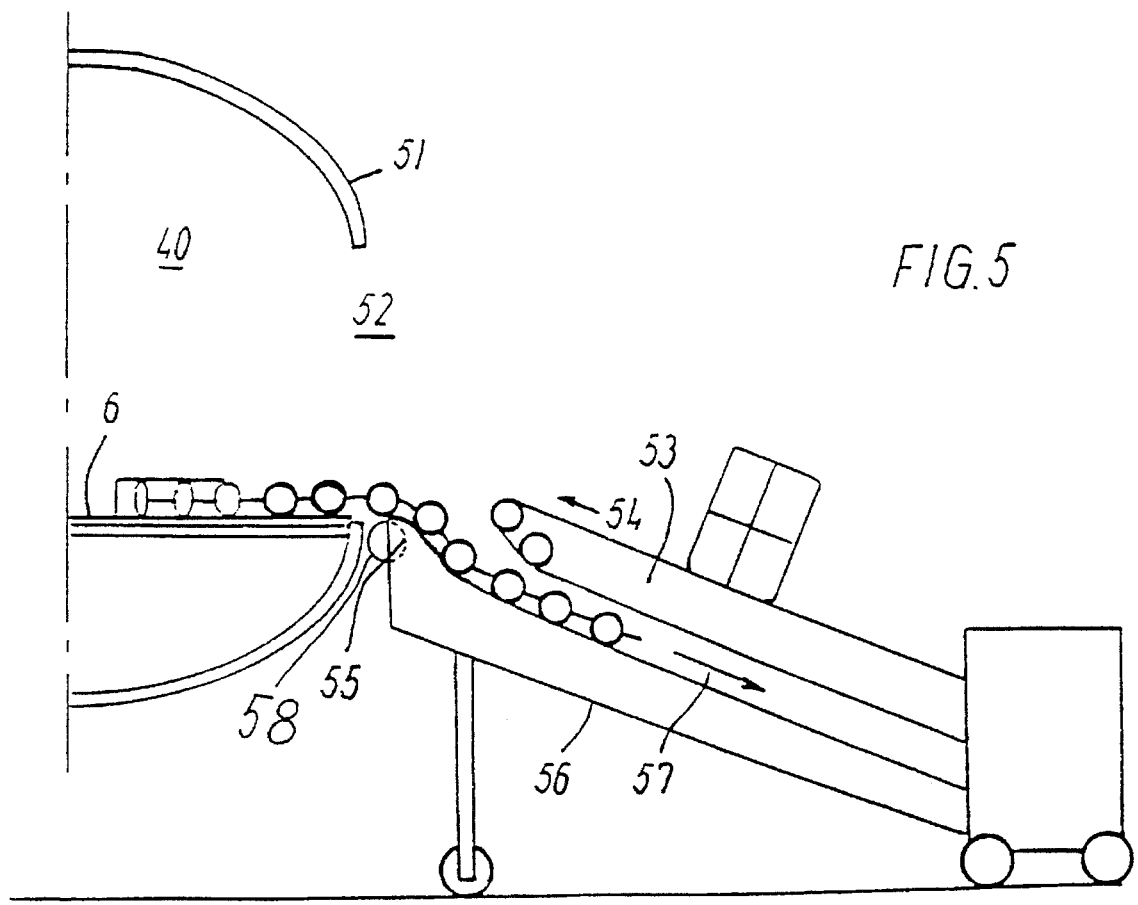

FIG. 5 shows an example of the way in which the conveyor, according to the invention, can be used for loading the cargo compartment of an aircraft.

The body of the aircraft is shown schematically at 51. 52 shows the doorway to the cargo compartment 40 (door removed). Outside the door 52 there is a belt conveyor 53 of a known type which can transport parcels, boxes, and luggage etc. upwards in the direction of the arrow 54.

The conveyor according to the invention has been placed on the floor 6 in the cargo compartment 40. For the sake of clarity, it is shown very schematically in FIG. 5 as a series of "linked circles" representing each individual roller/shaft unit and the chain. From the doorway 52 the conveyor, according to the invention, runs over a cylinder 58 at the tip 55 of the rack 56 of the belt conveyor 53 and downwards beneath the belt conveyor 53. The arrow 57 indicates the direction in which the conveyor according to the invention has to be pulled out of the cargo compartment as it is being filled with luggage and all the way out of the cargo compartment when the job is done. When the conveyor according to the invention is to be introduced in the cargo compartment 40, a push-force is exerted on the chain in the opposite direction of the arrow 57.

In a practical, useful embodiment, the conveyor according to the invention has a height of approximately 10 cm above the floor.

Figure 6:
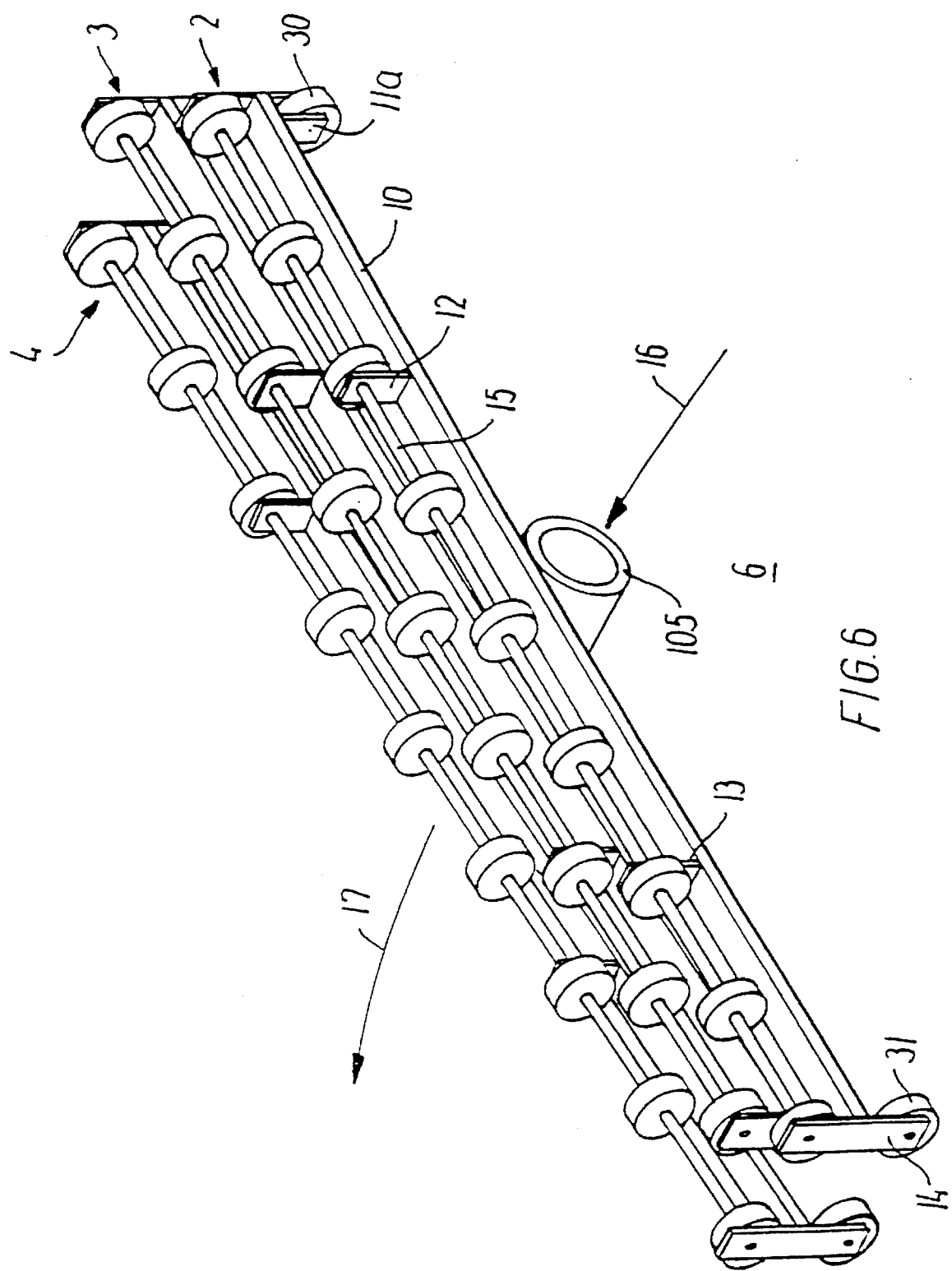
Figure 7:
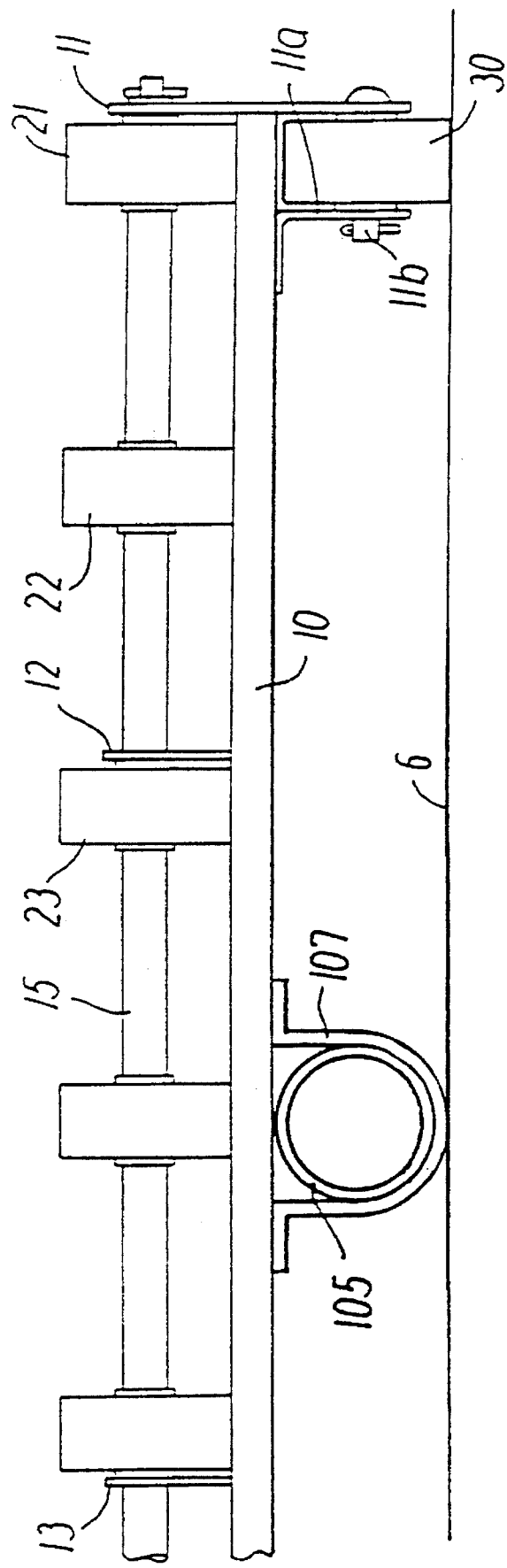

The above description presupposes that all luggage supporting rollers 21, 22, 23, etc. can rotate freely. However, the conveyor may also be configured so that there is e.g. at least a certain number of driven rollers on every second or third roller shaft unit. For this purpose such roller driving units may be designed with driving means of known type. Another possibility for a driving chain is to use a plastic tube 105 (FIGS. 6 and 7), sufficiently rigid longitudinally to push forward or withdraw the units, yet sufficiently flexible sidewards for the units to be placed in a curve and/or follow a form variable base, as shown at the passage from the floor of the cargo compartment 6 to the conveyor rack 56 in FIG. 5. In that case the inside of the tube can be used for electric cables for the motors of the driving roller/shaft units or for driving wires enabling appropriate rollers to be driven. On this tube, 105 essentially U-shaped clamps 107 can be mounted at even intervals, with the same function as a chain link, each carrying its own roller/shaft unit.

I claim:

1. A conveyor for transporting general cargo comprising:

at least two roller/shaft units;

a supporting rail associated with each unit extending along a width of the conveyor, wherein the supporting rail carries a shaft parallel to the supporting rail for supporting cargo rollers;

at least one cargo roller on a top side of each of said units forming a supporting surface for the cargo;

at least one rail roller on an underside of said unit adapted to carry the conveyor on a base; and a longitudinally rigid, flexible driving means, fastened to the underside of each supporting rail, wherein the driving means links the units together essentially along a center line of the conveyor, and which together with the rail rollers rest upon the base and support the units of the conveyor.

2. A conveyor according to claim 1, wherein the units are linked together at even intervals.

3. A conveyor according to claim 1, wherein the driving means is a curve-following chain.

4. A conveyor according to claim 3, wherein the units of the conveyor are fixed to individual chain links.

5. A conveyor according to claim 1, wherein the driving means is a cardan chain.

6. A conveyor according to claim 5, wherein the units of the conveyor are fixed to individual chain links.

7. A conveyor according to claim 1, wherein the driving means comprises:

a tube; and supporting clamps, wherein the supporting clamps are fixed to the underside of each unit.

8. A conveyor according to claim 1, wherein the units are offset in their longitudinal direction in relation to the driving means.

9. A conveyor according to claim 1, wherein the supporting rail comprises a torsionally rigid, U-shaped rail open at the top.

10. A conveyor according to claim 1, wherein placement of an axis of rotation of the cargo rollers is chosen in relation to a height of the driving means, measured from the base, so that upper generating lines of the cargo rollers together create a surface parallel to the base for supporting the cargo.

* * * * *